(12) United States Patent
Hensel et al.

(10) Patent No.: US 6,517,721 B1
(45) Date of Patent: Feb. 11, 2003

(54) DIALYZERS AND METHOD FOR MODIFYING THE SAME USING A LASER

(75) Inventors: Eckehard Hensel, Kreischa (DE); Hendrik Wust, Dresden (DE)

(73) Assignee: Fraunhofer-Gesellschaft zur Förderung der Angewandten Forschung e.V., München (DE)

( * ) Notice: Subject to any disclaimer, the term of this patent is extended or adjusted under 35 U.S.C. 154(b) by 0 days.

(21) Appl. No.: 09/600,878

(22) PCT Filed: Dec. 3, 1999

(86) PCT No.: PCT/EP99/09477

§ 371 (c)(1),
(2), (4) Date: Aug. 21, 2000

(87) PCT Pub. No.: WO00/35566

PCT Pub. Date: Jun. 22, 2000

(30) Foreign Application Priority Data

Dec. 11, 1998 (DE) .......................................... 198 57 139

(51) Int. Cl.[7] .......................... B01D 69/00; B01D 69/08
(52) U.S. Cl. .............................. 210/321.8; 210/321.79; 210/321.88; 210/321.89
(58) Field of Search .................... 210/321.79, 321.8, 210/321.78, 321.88, 321.89, 321.87, 500.23

(56) References Cited

U.S. PATENT DOCUMENTS

| 4,001,110 A | 1/1977 | Geen et al. |
| 4,211,602 A | 7/1980 | Brumfield |
| 4,369,605 A | 1/1983 | Opersteny et al. |
| 5,814,179 A | 9/1998 | Ohmori et al. ........ 210/321.71 |

FOREIGN PATENT DOCUMENTS

| EP | 0044193 | 1/1982 |
| JP | 57-87804 | 6/1982 |
| JP | 58-20204 | 2/1983 |
| JP | 2-49199 | 2/1990 |
| JP | 6-55042 | 3/1994 |
| WO | 98/28065 | 7/1998 |

OTHER PUBLICATIONS

An English Language abstract of 6–55042.
Database WPI Abstract No. 1982–56255E.
Chemical Abstracts No. 97:183596.
English Language abstract of JP 6–55042.
Database WPI Abstract No. 1994–106083.
English Language abstract of JP 2–49199.
Database WPI Abstract No. 1990–096284.
English Language abstract of JP 58–20204.
Chemical Abstracts No. 98:199402.

*Primary Examiner*—John Kim
(74) *Attorney, Agent, or Firm*—Greenblum & Bernstein, P.L.C.

(57) ABSTRACT

Dialyzer and process of modification of a dialyzer with a laser are disclosed. Process for producing a dialyzer includes a medium IR pulsed laser surface treatment at least in place of the last precision cut. Process reduces standstill times during treatment of dialyzer ends to achieve a smooth surface of the dialyzer ends. Dialyzer hollow membrane ends in entrance and exit regions in the region of plastic embedding are funnel shaped, have rounded edges, and, along with the plastic, form a smooth, melted, and purified surface.

8 Claims, 2 Drawing Sheets

DIALYZERS AND METHOD FOR MODIFYING THE SAME USING A LASER

FIELD OF THE INVENTION

The invention applies to the fields of medical technology and laser technology and relates to dialyzers as they can be used, for example, for hemodialysis and ultrafiltration, and to a process for modifying these dialyzers by means of a laser.

BACKGROUND OF THE INVENTION

Capillary hollow membranes have been used for a long time for liquid-phase permeation, in particular hemofiltration and ultrafiltration. These hollow membranes can be made of various materials, for example, cellulose.

Such hollow membranes are bound together into bundles and are inserted into a cylindrical filter body, the dialyzer. Subsequently, both ends of the bundles are fixed in the dialyzer using a plastic. Various plastics can be used here. This fixation seals the dialyzer and, at the same time, seals the hollow membranes off from the dialyzer. The protruding plastic in which the ends of the hollow membranes are embedded is removed using a multi-step cutting process so that the ends of the hollow membranes are uncovered again.

U.S. Pat. No. 5,814,179 describes in detail the prior art concerning the manufacture of dialyzers and the demands placed upon them, and the problems in the manufacturing process. The emphasis of the content is the improvement of the effectiveness of the membrane effect of the embedded hollow membranes. The uncovering of the hollow membranes occurs by means of a mechanical cutting process (WO 98/28065 A1). Thus, the quality of dialyzers and, in particular, the quality of the cut surfaces with the entrance and exit openings of the hollow membranes, depends solely on the quality of the mechanical cut that can be achieved.

As a rule, for one cutting process, at least 2 rough cuts and 2 precision cuts are needed at each dialyzer end. In this connection, a different knife is used for each cut, i.e., eight knives are necessary per system. Hardened steel knives with a double ground edge and a lapped bevel are used. The service life of the knives differs; it lies between 10 and a maximum of 3000 cuts per knife. For each changing of a knife, the system must be stopped. Thus, standstill periods occur often. These standstill periods furthermore change the cutting result in a negative fashion because of the continuing hardening of the plastic.

During the cutting process, the cutting direction runs perpendicular to the lengthwise axis of the hollow membrane; there are no lateral cutting force components like in the case of an agitated circular cut. The clearance angle of the knife must be selected to be as small as possible in order to prevent a cutting force component parallel to the hollow membrane and therefore a pulling out of the hollow membrane. However, small clearance angles often cause a sliding of the free surface of the knife on the plastic as a result of an elastic resilience and thus a resulting damage to the cutting surface due to friction.

After the final cut, the plastic must have a microscopically smooth surface (FIG. 1). In this situation, the hollow membranes may not be damaged or detached from the plastic. During use, even slight damage to the surface of the hollow membrane ends can lead to injuries of the red blood cells and thus to blood clotting. In order to fulfill these high demands, the cutting knives that are used are replaced often. Nonetheless, the reject rate is very high.

The object of the invention is to reduce the standstill periods during the processing of the dialyzer ends and to achieve a smooth surface of the dialyzer ends.

The object is attained by the invention specified in the claims. Further embodiments are the object of the subclaims.

Figure 1:
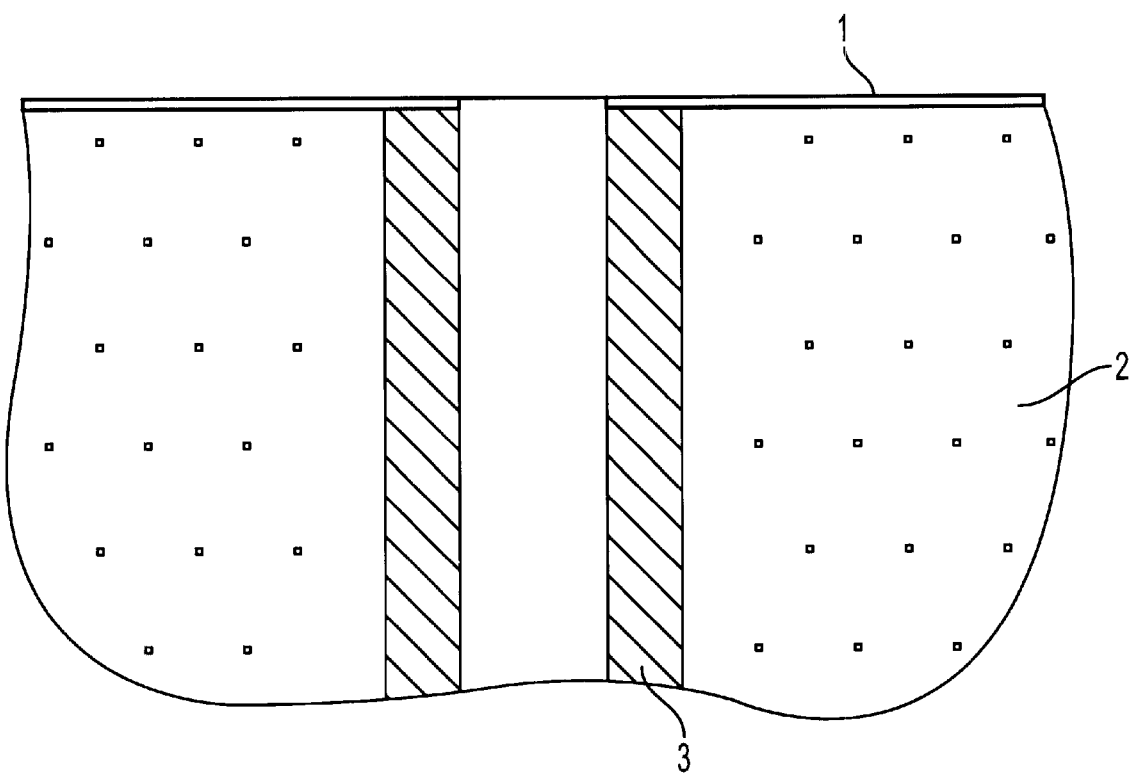
FIG. 1 shows a hollow membrane end according to the prior art.

In the drawings, reference number 1 refers to a cut surface; 2 is plastic adhesive; 3 is a hollow membrane/hollow cellulose membrane; 4 is a laser-treated surface; 5 is a funnel-shaped opening; and 6 is a laser beam.

DESCRIPTION OF THE INVENTION

Using the process according to the invention, a dialyzer according to the invention is produced that consists of bundles of hollow membranes in a cylindrical body. These hollow membrane bundles are embedded at both face ends in a plastic that seals the body and seals the hollow membranes off from the body. After the excess plastic has been cut off and removed from the face surface of the dialyzer, all the hollow membrane ends are open and form one plane with the plastic surface. Using the process according to the invention, the hollow membrane ends in the entrance and exit areas in the region of the plastic embedding are now embodied in the shape of a funnel, have rounded edges and, along with the plastic, have a smooth, melted, and purified surface.

Here, corresponding to the process according to the invention, the hollow membranes are initially placed into a cylindrical body, fixed at their ends in the body by means of a plastic, and the hollow membrane ends are subsequently uncovered by cutting off the plastic perpendicular to the longitudinal axis of the hollow membranes. In so doing, at least the rough cuts are performed corresponding to the process according to the prior art using mechanically graduated sequences of severance cuts perpendicular to the longitudinal axis of the hollow membranes. Subsequently, according to the invention, in place of at least the last precision cut, a surface treatment is performed using pulsed laser radiation in the medium IR range.

In this connection, laser radiation is advantageously used with a pulse duration that lies in the $\mu$s to ns range.

It is also advantageous if wavelengths of the laser radiation are used that lie in the range of 9 to 11 $\mu$m.

Moreover, laser radiation with a high energy density is advantageously used, in which this energy density can, in particular, lie in the range of 8 to 12.5 $J/cm^2$.

It is moreover advantageous if, in the process according to the invention, a TEA $CO_2$ laser is used.

Using the process according to the invention, at least the last precision cut is replaced with a surface treatment with pulsed laser radiation in the medium IR range.

By means of the laser radiation, the surface of the plastic containing the hollow membrane ends is remelted without the appearance of burrs in the plastic matrix or in the hollow membrane ends. Surfaces that have been treated in this manner have a microscopically smooth surface that meets all the requirements that have been set.

Figure 2:
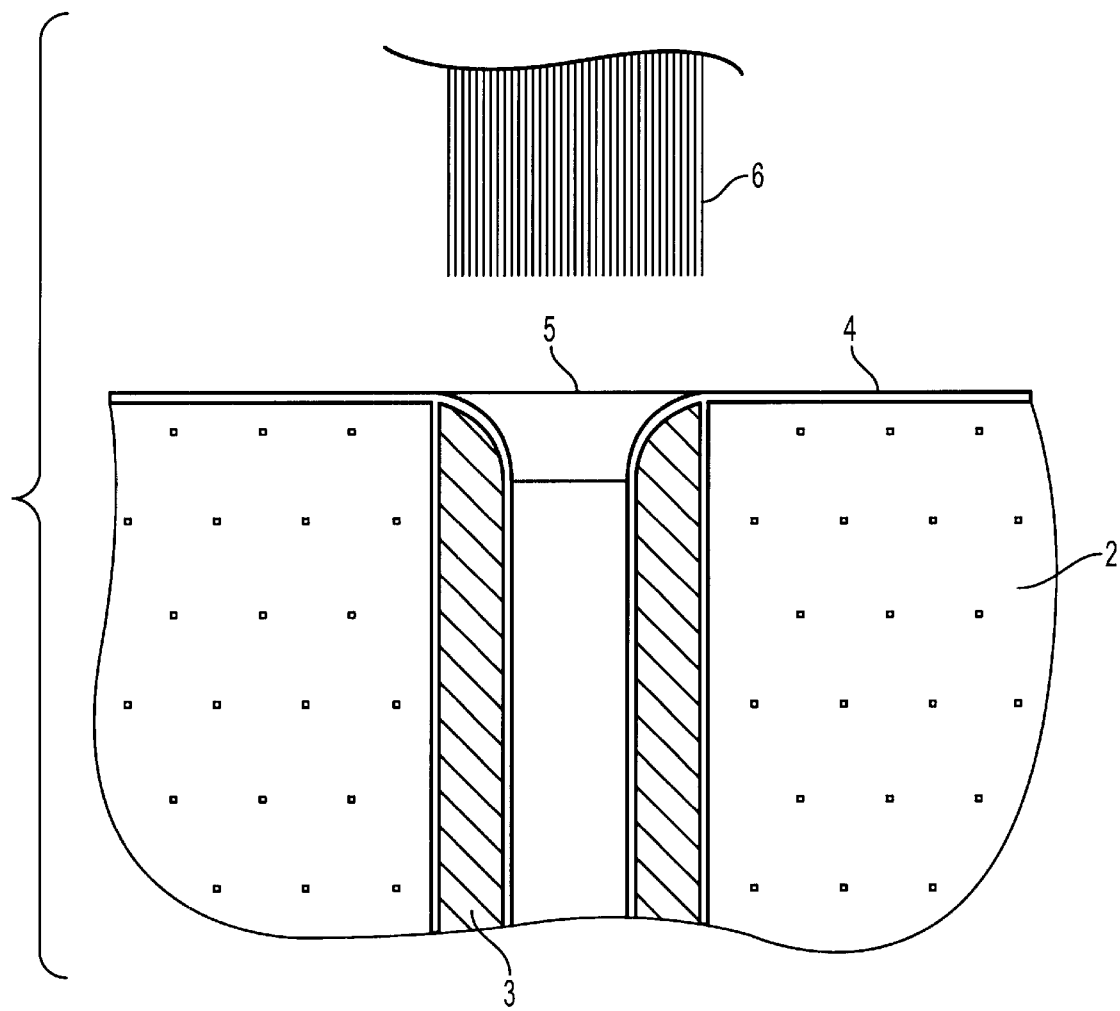
FIG. 2 shows hollow membrane ends after treatment according to the present invention.

A special feature and advantage of laser processing is the rounding off and funnel-shaped widening of the ends of the hollow membranes, as shown in FIG. 2.

In this connection, the funnel-shaped widening is limited to the region of the hollow membrane ends in the plastic so that there is no adverse effect on the function of the dialyzer.

The hollow membrane ends that have been widened in the shape of a funnel allow a better entrance and exit flow of the liquids and reduction or prevention of damage, in particular to red blood cells in hemodialysis, whereby the danger of clotting is minimized.

A further advantage of the solution according to the invention consists in the fact that the number of the mechanical cutting processes can be reduced to a minimum because the treatment with the laser radiation can replace all precision cuts as well. In this process, the quality of the rough cuts according to the prior art process is sufficient for the subsequent laser treatment. The cutting tools of the rough cuts have a substantially longer service life because the demands are less stringent. The expensive precision cuts are partially or completely eliminated.

Also an advantage of the solution according to the invention is that a smooth surface is achieved without damaging the plastic as a result of elastic breakaways or grooves in the surface. With larger possible clearance angles, the adhesion of the plastic to the knives is prevented. A bruised or torn plastic surface is prevented to the greatest extent possible or is smoothed out again by the laser treatment.

The invention is explained in more detail below with reference to several exemplary embodiments, in which example 2 describes the best manner of practicing the invention.

EXAMPLE 1

A polyurethane adhesive is used for fixing a bundle of hollow cellulose membranes in the cylindrical body of the dialyzer. By means of two rough cuts on each face end of the body, excess polyurethane adhesive is removed to such an extent that the hollow membrane ends are all exposed. The surfaces prepared in this manner are subsequently smoothed by means of remelting with the aid of a laser.

A TEA $CO_2$ laser with a capacity of 50 W, a working area of 1.21 $cm^2$, a pulse duration of 250 $\mu s$, and a wavelength of 10.6 $\mu m$ is used for the laser treatment. The treatment of the total area occurs by means of a relative movement between the laser beam and the surface of the material.

After the laser treatment, the filter surface is partially melted and solidified in this state; the hollow membranes are open and widened in the shape of a funnel.

EXAMPLE 2

For the purpose of fixing the bundle of hollow cellulose membranes in the cylindrical body of the dialyzer, a polyurethane adhesive is used. By means of two rough cuts on each face end of the body, excess polyurethane material is removed to such an extent that the hollow membrane ends are all exposed. The surfaces prepared in this manner are subsequently smoothed by means of remelting with the aid of a laser.

A TEA $CO_2$ laser with a capacity of 65 W, a working area of 1.21 $cm^2$, a pulse duration of 250 $\mu s$, and a wavelength of 10.6 $\mu m$ is used for the laser treatment. The treatment of the total area occurs by means of a relative movement between the laser beam and the surface of the material.

After the laser treatment, the filter surface is uniformly melted and solidified in this state; the hollow membranes are open and widened in the shape of a funnel. The uniform melted layer has a thickness of less than 1 mm.

By means of the process according to the invention, a decrease in standstill times of about 15% is achieved.

EXAMPLE 3

The production of the dialyzer is accomplished according to the process in example 2.

A TEA $CO_2$ laser with a capacity of 78 W, a working area of 1.21 $cm^2$, a pulse duration of 250 $\mu s$, and a wavelength of 10.6 $\mu m$ is used.

After the laser treatment, the filter surface is uniformly melted and solidified in this state; the hollow membranes are open and widened in the shape of a funnel.

What is claimed is:

1. A dialyzer comprising:
   a cylindrical body containing bundles of hollow membranes having first and second open ends;
   the first and second open ends being embedded in plastic that seals the body and seals the membranes off from the body;
   at least the membrane first open ends and a surface of the plastic comprise a pulsed laser-melted, microscopically smooth, and purified layer in which the first open ends comprise pulsed laser-rounded funnel-shaped edges.

2. The dialyzer of claim 1, wherein the layer is less than 1 mm thick.

3. The dialyzer of claim 1, wherein the layer is formed by a pulsed laser surface treatment of 9 to 11 $\mu m$ wavelength radiation.

4. The dialyzer of claim 2, wherein the layer is formed by a pulsed laser surface treatment of 9 to 11 $\mu m$ wavelength radiation.

5. The dialyzer of claim 3, wherein the radiation has an energy density of 8 to 12.5 $J/cm^2$.

6. The dialyzer of claim 4, wherein the radiation has an energy density of 8 to 12.5 $J/cm^2$.

7. The dialyzer of claim 3, wherein the layer is formed by a TEA $CO_2$ laser.

8. The dialyzer of claim 4, wherein layer is formed by a TEA $CO_2$ laser.

* * * * *